W. C. Gardner,
Corn Planter.
No. 86,386. Patented Feb. 2, 1869.
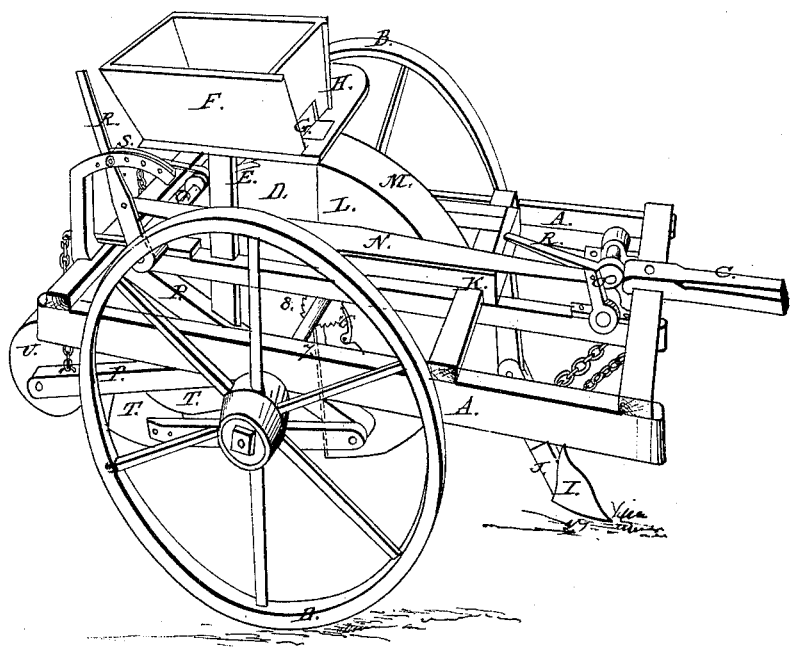
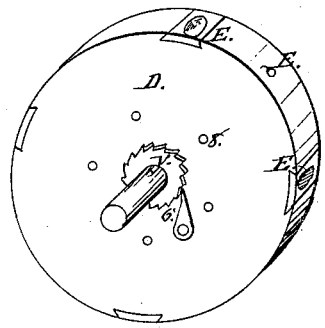
Witnesses:
H. S. Sprague
J. H. Swartwant
Inventor:
Wm. C. Gardner
by
T. S. Sprague
Atty.

UNITED STATES PATENT OFFICE.

WILLIAM C. GARDNER, OF POKAGON, MICHIGAN.

Letters Patent No. 86,386, dated February 2, 1869.

IMPROVEMENT IN CORN-PLANTERS.

The Schedule referred to in these Letters Patent and making part of the same.

*To whom it may concern:*

Be it known that I, WILLIAM C. GARDNER, of Pokagon, in the county of Cass, and State of Michigan, have invented a new and useful Improvement in Planters; and I do declare that the following is a true and accurate description thereof, reference being had to the accompanying drawings, and to the letters of reference marked thereon, and being a part of this specification.

Figure 1 is a perspective view of my apparatus, and

Figure 2, a perspective view of my dropping-wheel.

The same letters indicate like parts in each figure.

This invention consists in arranging upon a proper frame, and supported by suitable traction-wheels, from which the working-parts of the machine derive motion, a hopper to carry the potatoes, corn, or other seed which requires to be planted in hills, the hopper being provided with an opening at its forward end, through which the seed passes to proper openings in the periphery of a wheel or drum, which openings are placed at suitable distances apart, to drop the seed at the required distances.

This wheel is rigidly attached to the shaft or axle, upon which are placed the traction-wheels, one of which is also rigidly attached to the axle, and revolves with it, while the other is sleeved upon the axle.

A seat is provided for the driver, upon the side of the hopper, so that he can, with one hand, control the passage of seed from the hopper.

My apparatus is also provided with a proper plow for opening a drill or small furrow in front of the dropping-wheel, and with covering-plows in the rear of said wheel to cover the seed, and a concave-surfaced roller to pack the earth over the same.

The front plow and the roller are hung upon proper arms, and connected by cords or chains to semi-rotating shafts, (which are connected together by a proper rod,) and can be raised or lowered, as occasion may require, by a suitable lever, held in place by a quadrant and pin.

The covering-plows are connected by a rod to the frame that carries the roller, in such a manner that the raising of the roller produces the same motion of the covering-plows.

Upon the axle, by the side of the dropping-wheel, is placed a ratchet-wheel, which, engaging with a suitable pawl and spring, prevents the dropping-wheel from slipping.

This dropping-wheel is provided with a shield, to prevent the seed from dropping until the opening containing it shall be directly over the spot where it is desired to plant it.

The side of the shield is provided with a spring, which is operated by a pin in the side of the dropping-wheel, and gives a signal to the operator, by its spring or noise, that the seed is correctly dropped.

My apparatus can be used for planting potatoes, by leaving open the larger openings on the periphery of the dropping-wheel.

Should it be desired to plant corn, these larger openings should be closed in any suitable manner, and the smaller openings, as represented by the screw-head in fig. 2, be opened.

These openings should be placed at such distances apart as to insure the dropping of the seed at like distances apart.

Having thus described the object and construction of my invention, I will now name its various parts, so that those skilled in the art will understand it, when taken in connection with the drawings.

A is a frame, surmounted upon a proper axle, provided with suitable traction-wheels B, one of which is rigidly attached to the axle, while the other is loosely sleeved upon it.

C is a pole, to which to attach the team.

The wheel D is rigidly attached to the axle, at its centre, and is provided with the openings E in its periphery, hereinbefore described.

F is a hopper, provided with a proper opening and slide G, through which the seed passes from the hopper to the openings E in the wheel D, and H is the driver's seat.

I is a proper plow, to open the furrow for the seed, and is attached to the arm J, hinged to the frame K, which is pivoted at its rear end to the wheel-case L.

M is a shield, fitting the front half of the wheel D, and which prevents the seed from leaving the openings in the wheel, in its forward revolution, until the openings are directly over the spot where the seed is to be deposited.

N is a rod or bar, connecting the shafts O, to which are attached, by proper chains, the frames K and P, in such a manner that the plows and roller may be raised or lowered at pleasure, by either of the levers R, the lever at the rear end of the machine being provided with a quadrant and pin, S, to hold the lever in place.

T are the covering-plows, so arranged as to throw back the earth into the furrow made by the plow I, and U is the roller, already described.

V is the ratchet, and 6, the pawl.

7 is the spring upon the edge of the case L, which being struck by the pin 8, in the side of the wheel D, is snapped, giving notice to the operator that the seed is dropped correctly, and that the dropping-wheel D has not slipped.

What I claim as my invention, and desire to secure by Letters Patent is,—

1. The connecting-bar N, in connection with the shafts O and levers R, when operating substantially as and for the purposes described.

2. The combination, with the dropping-wheel D, of ratchet V, pawl 6, pins 8, and spring 7, for the purpose of preventing the wheel from slipping, and securing its prompt and correct operation, substantially as described.

WM. C. GARDNER.

Witnesses:
H. S. SPRAGUE,
J. H. SWARTWOUT.